H. E. YARROW.
PROPULSION OF VESSELS.
APPLICATION FILED OCT. 30, 1917.
1,327,510.
Patented Jan. 6, 1920.
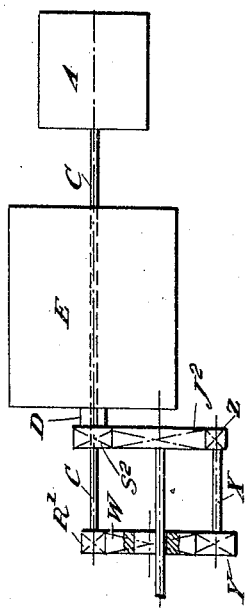
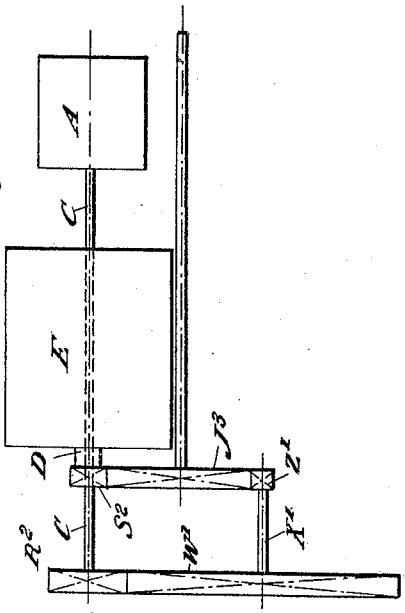
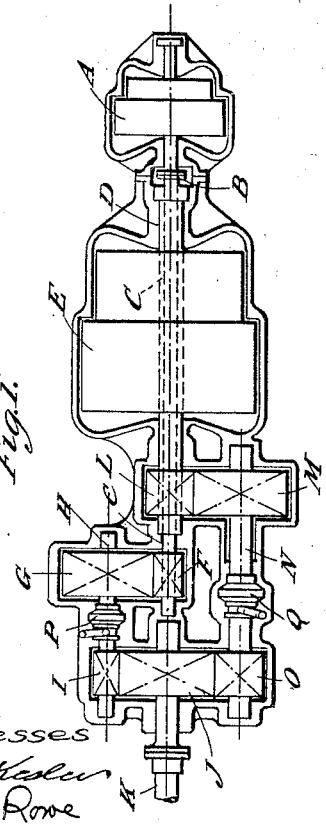
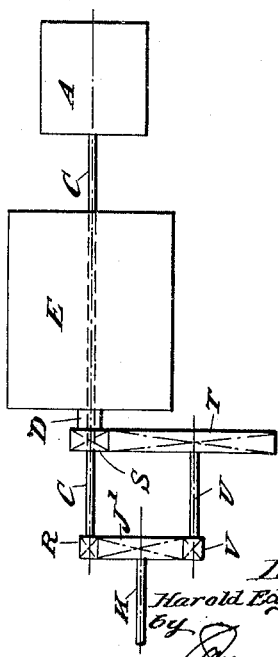
Witnesses
Inventor
Harold Edgar Yarrow
By
Attorney

UNITED STATES PATENT OFFICE.

HAROLD E. YARROW, OF GLASGOW, SCOTLAND.

PROPULSION OF VESSELS.

1,327,510.　　　　　Specification of Letters Patent.　　Patented Jan. 6, 1920.

Application filed October 30, 1917. Serial No. 199,316.

*To all whom it may concern:*

Be it known that I, HAROLD EDGAR YARROW, a subject of the King of Great Britain, residing in Glasgow, Scotland, have invented certain new and useful Improvements Relating to the Propulsion of Vessels, of which the following is a specification.

In British Letters Patent No. 21,977 of 1911 an arrangement is described by which two sets of engines can be coupled to a propeller shaft, so that either can be used for propelling purposes, while the other is stationary or both can be used at the same time when greater power is required. This result was obtained by carrying a shaft of one engine through the hollow main shaft of the other engine.

In the case in which there is a considerable difference between the normal working speeds of the two engines, as for instance, when one engine is of the internal combustion type and the other a steam turbine, the shaft of one engine is not connected directly by a coupling to the through shaft driving the propeller, but suitable gearing is interposed between the main shafts of the two engines by which the normal speed of the through shaft is made similar to the normal speed of the hollow shaft.

In this known arrangement the axes of the main shafts are not in the same line.

According to the present invention, in which two or more engines can drive separately, or in combination, the same propeller through the medium of a hollow shaft, and in which gearing is interposed between the main and propeller shafts, the axes of the engines are arranged in the same line. This arrangement enables greater stiffness and structural strength to be obtained in the combined plant and preserves the alinement of the shafting even under severe working conditions.

The arrangement is especially useful where a high and a low pressure turbine are coupled by suitable gearing to the same propeller shaft. In this case, the rotor spindle of the low pressure turbine is bored to a diameter which permits the spindle of the high pressure turbine to pass through it.

The accompanying drawings illustrate examples of arrangements according to the invention, in which Figure 1 is an axial longitudinal view, showing the gearing and arrangements of the shafts of a high and low pressure turbine.

Figs. 2, 3 and 4 show alternative arrangements of the gearing connecting the shafts of the high and low pressure turbines.

In Fig. 1, A is a high pressure turbine connected by a coupling B to a shaft C, which rotates in the hollow shaft D of the low pressure turbine E. On the shaft C is a pinion F, gearing with a wheel G on a second motion shaft H, which drives through a pinion I a wheel J on the propeller or thrust shaft K.

On the hollow shaft D of the low pressure turbine E is a pinion L gearing with a wheel M mounted on a second motion shaft N, which drives through a pinion O the wheel J.

Manually operated sliding clutches of known construction are provided at the second motion shafts at P and Q.

When the clutch P is in the disengaged position the turbine E drives the shaft K. When the clutch P is engaged and the clutch Q is disengaged the turbine A drives the shaft K. When both clutches are in engagement the turbines A and E act in conjunction to drive the shaft K.

In the arrangement shown in Fig. 2, the shaft C of the high pressure turbine A, which passes through the hollow shaft D of the low pressure turbine E, carries a pinion R gearing with a wheel $J^1$ on the propeller or thrust shaft K. A pinion S on the shaft D gears with a wheel T on an intermediate shaft U carrying a pinion V gearing with the wheel $J^1$.

In the arrangement shown in Fig. 3, a pinion $R^1$ on the shaft C of the high pressure turbine A gears with an intermediate wheel W, which drives an intermediate shaft X through a pinion Y and the shaft X drives the main wheel $J^2$ through a pinion Z. The hollow shaft D of the low pressure turbine carries a pinion $S^2$ gearing within the main wheel $J^2$.

In the arrangement shown in Fig. 4, a pinion $R^2$ on the shaft C of the high pressure turbine A gears with an intermediate wheel $W^1$ on the spindle $X^1$, and drives the wheel $J^3$ through a pinion $Z^1$ on the spindle $X^1$.

On the shaft D of the low pressure turbine E is a pinion $S^2$ gearing with the main wheel $J^3$.

It is to be understood that clutches similar to those shown at P and Q (Fig. 1) may be inserted in the shafts C, U, X and X' in the embodiments of the invention shown in Figs. 2, 3 and 4.

In any of the above arrangements the relative positions of the shafts may be interchanged, that is, the shaft of the low pressure turbine may revolve within the hollow shaft of the high pressure turbine.

For the high and low pressure turbines may be substituted engines of other types, for example, the combination of a steam turbine with an internal combustion engine.

The invention is not restricted to a combination of two engines only, three or more engines may be suitably combined on the same principle.

Having thus described the nature of the said invention and the best means I know of carrying the same into practical effect, I claim:—

1. In the propulsion of vessels, a plurality of engines normally running at different speeds having their drive shafts arranged coaxially, one of said drive shafts being hollow and surrounding the other drive shaft, a propeller shaft, and gearing between said drive shafts and said propeller shaft for transmitting motion at will from either or both of said drive shafts to said propeller shaft.

2. In the propulsion of vessels, a plurality of engines having their drive shafts normally running at different speeds but in the same direction arranged coaxially, one of said drive shafts being hollow and surrounding the other drive shaft, a propeller shaft, and gearing between said drive shafts and said propeller shaft for transmitting motion at will from either or both of said drive shafts to said propeller shaft.

3. In the propulsion of vessels, a plurality of engines normally running at different speeds having their drive shafts arranged coaxially, one of said drive shafts being hollow and surrounding the other drive shaft, a propeller shaft, means for driving a second motion shaft from the hollow drive shaft, means for driving another second motion shaft from the inner drive shaft and means for communicating the rotation of both second motion shafts to the propeller shaft.

4. In the propulsion of vessels, a plurality of engines normally running at different speeds having their drive shafts arranged coaxially, one of said drive shafts being hollow and surrounding the other drive shaft, a propeller shaft, means for driving a second motion shaft from the hollow drive shaft, means for driving another second motion shaft from the inner drive shaft, means for communicating the rotation of both second motion shafts to the propeller shaft, and flexible coupling devices on each of said second motion shafts.

5. In the propulsion of vessels, a plurality of engines normally running at different speeds having their drive shafts arranged coaxially, one of said drive shafts being hollow and surrounding the other drive shaft, a propeller shaft, a pinion on the inner drive shaft, a second motion shaft, a wheel on said motion shaft gearing with said pinion, a pinion on said motion shaft gearing with said propeller shaft, a pinion on said hollow drive shaft, another second motion shaft, a wheel on last mentioned motion shaft, and a pinion on said motion shaft gearing with said propeller shaft.

In testimony whereof I have signed my name to this specification in the presence of two subscribing witnesses.

HAROLD E. YARROW.

Witnesses:
 JAMES RITCHIE,
 SILVESTER LITTON.